Dec. 24, 1935.  N. H. SANDBERG  2,025,179
MACHINE FOR FORMING EGG FLATS
Filed Oct. 2, 1933  7 Sheets-Sheet 1
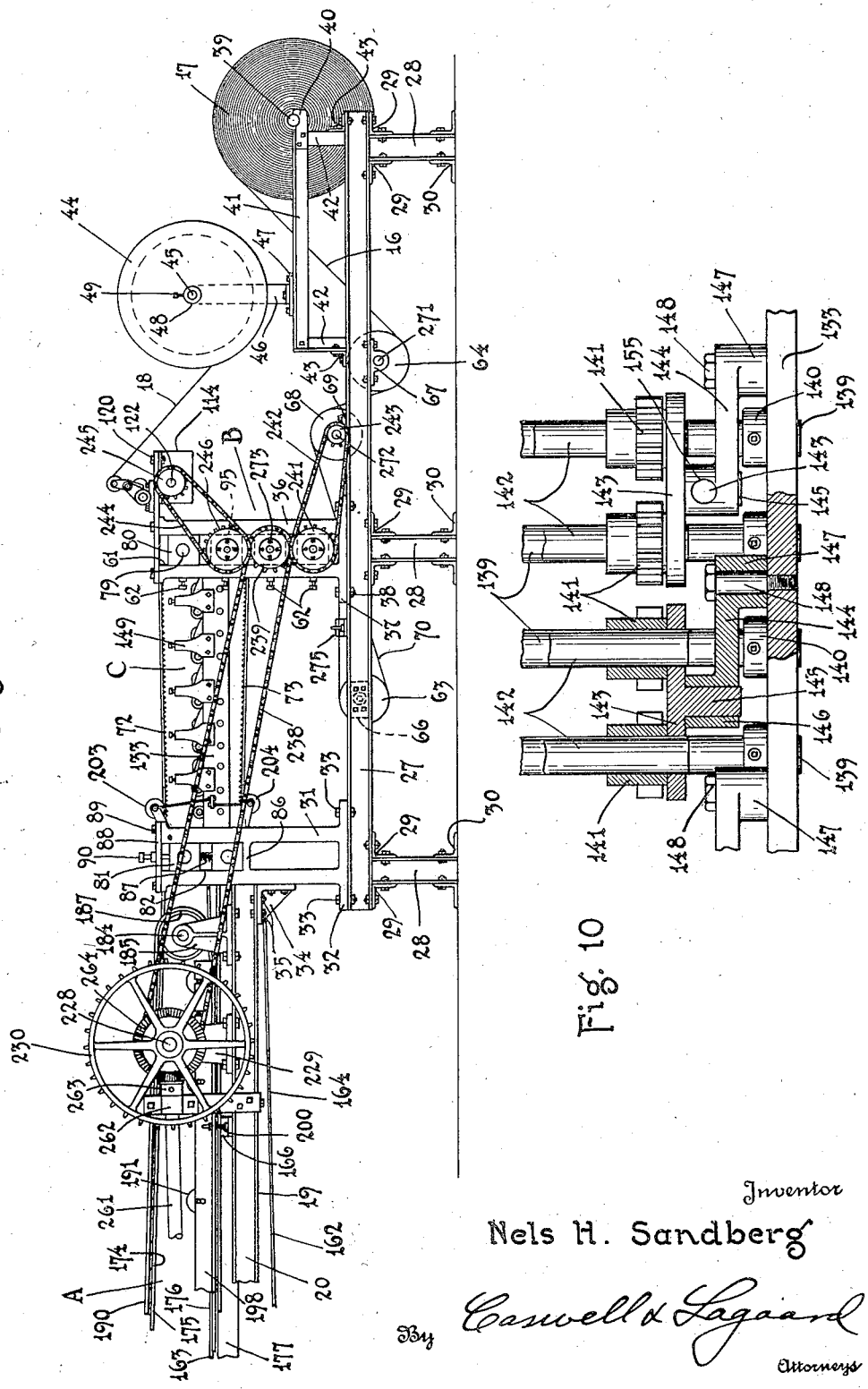
Inventor
Nels H. Sandberg
By Caswell & Lagaard
Attorneys Dec. 24, 1935.　　　N. H. SANDBERG　　　2,025,179
MACHINE FOR FORMING EGG FLATS
Filed Oct. 2, 1933　　　7 Sheets-Sheet 2
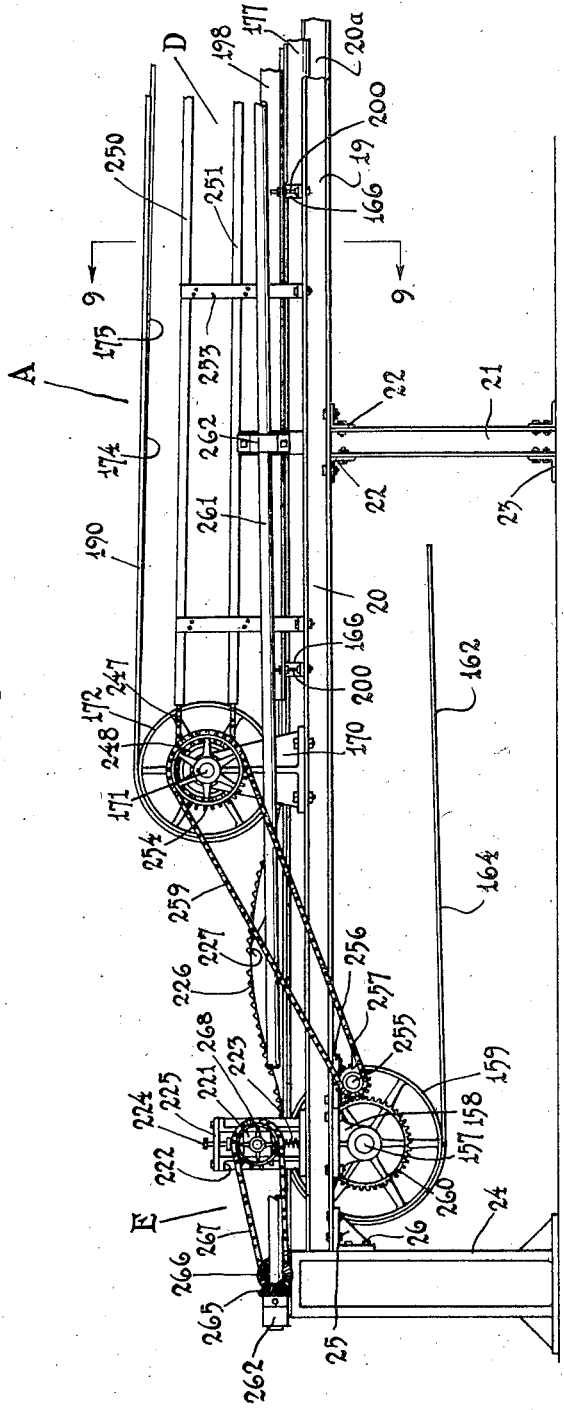
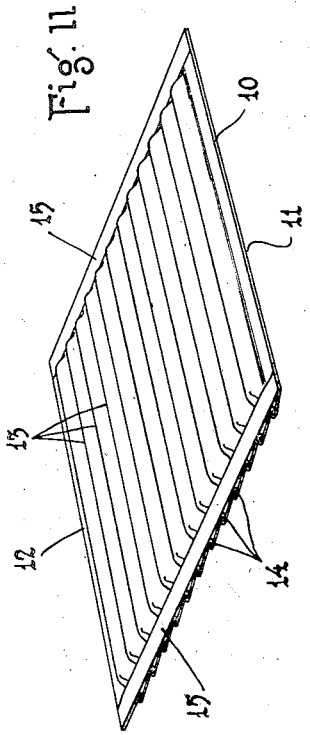
Inventor
Nels H. Sandberg
By Caswell & Lagaard
Attorneys

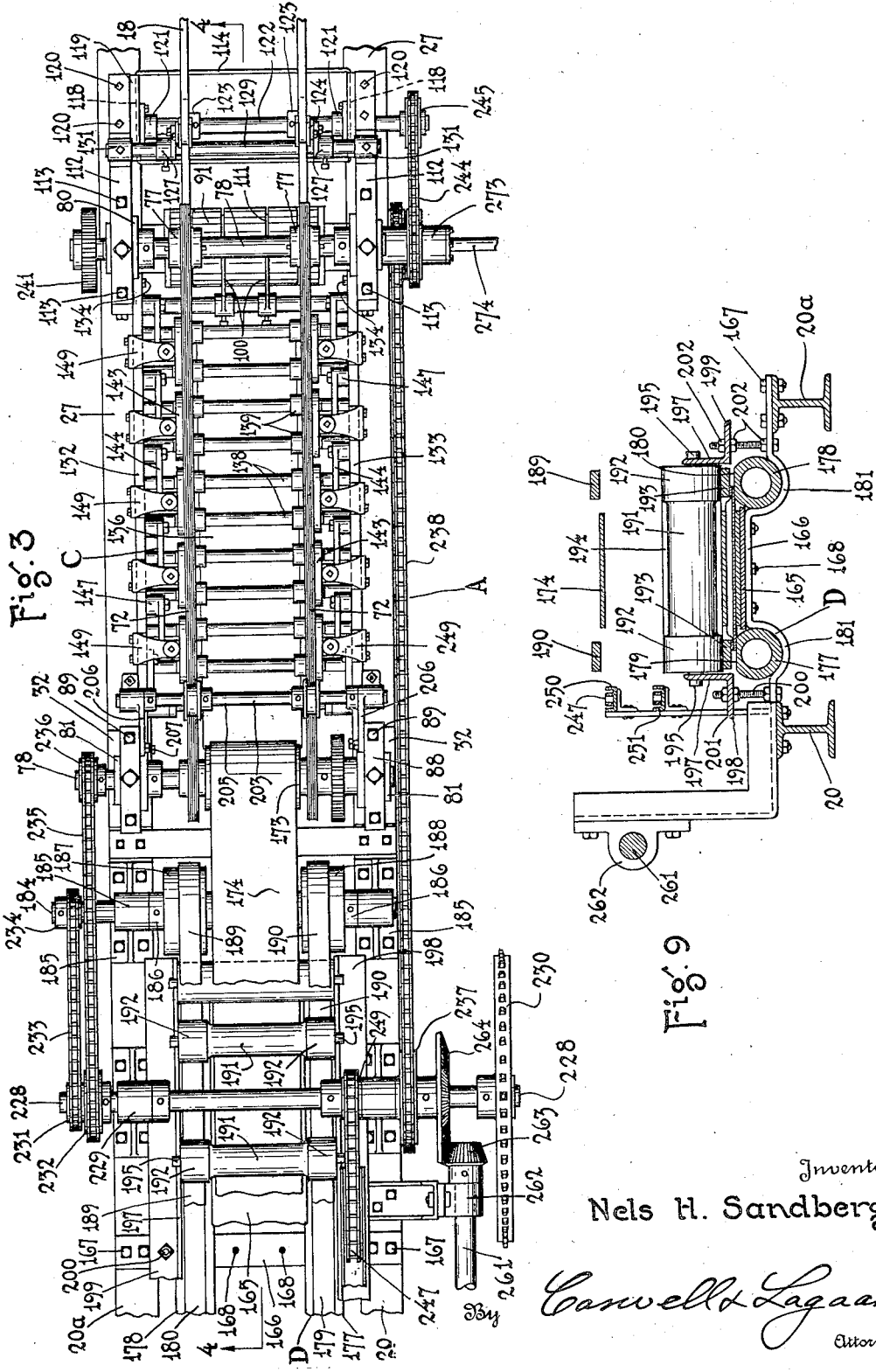
Dec. 24, 1935.  N. H. SANDBERG  2,025,179
MACHINE FOR FORMING EGG FLATS
Filed Oct. 2, 1933   7 Sheets-Sheet 3
Inventor
Nels H. Sandberg
By Caswell & Lagaard
Attorneys

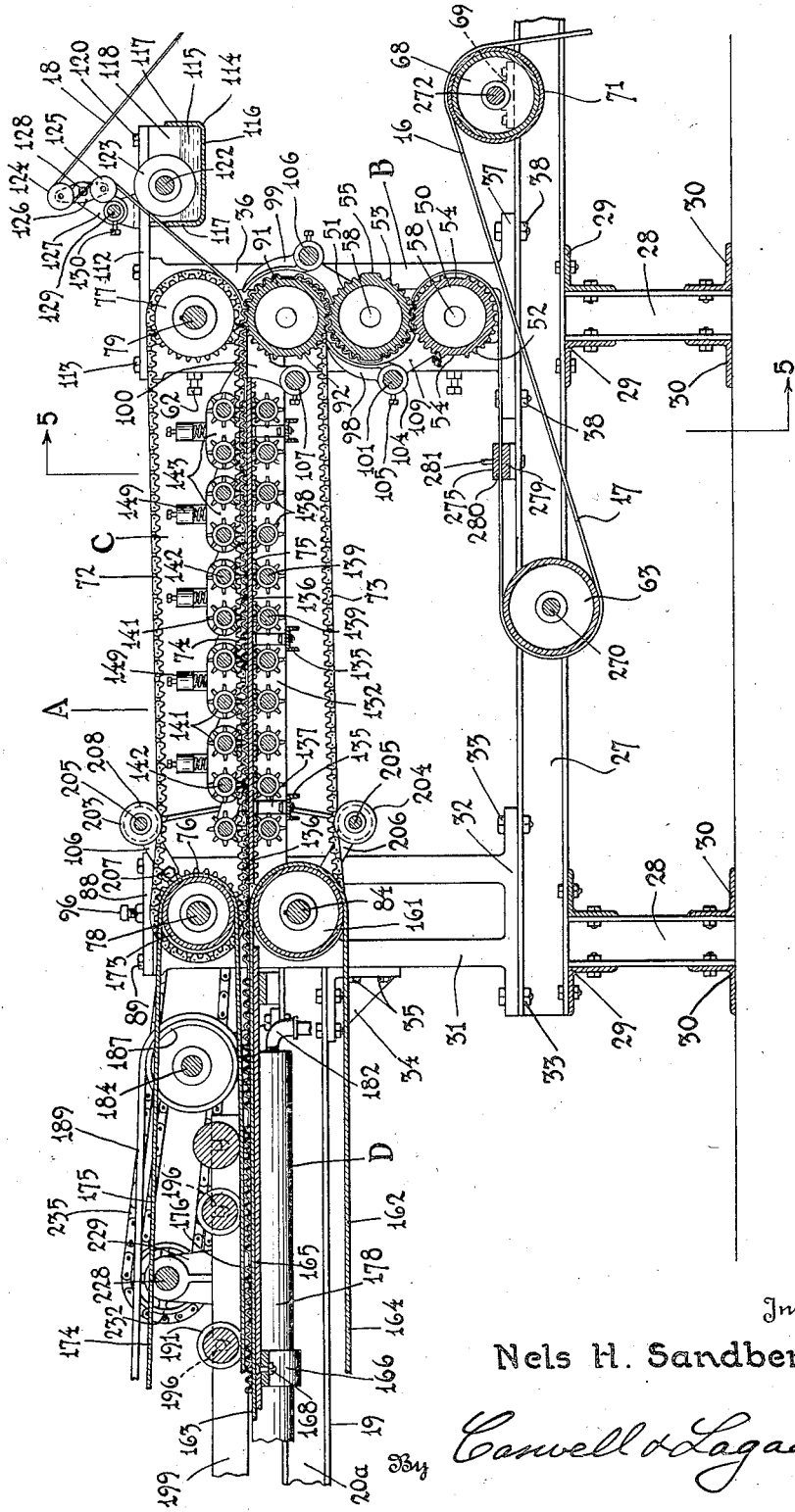

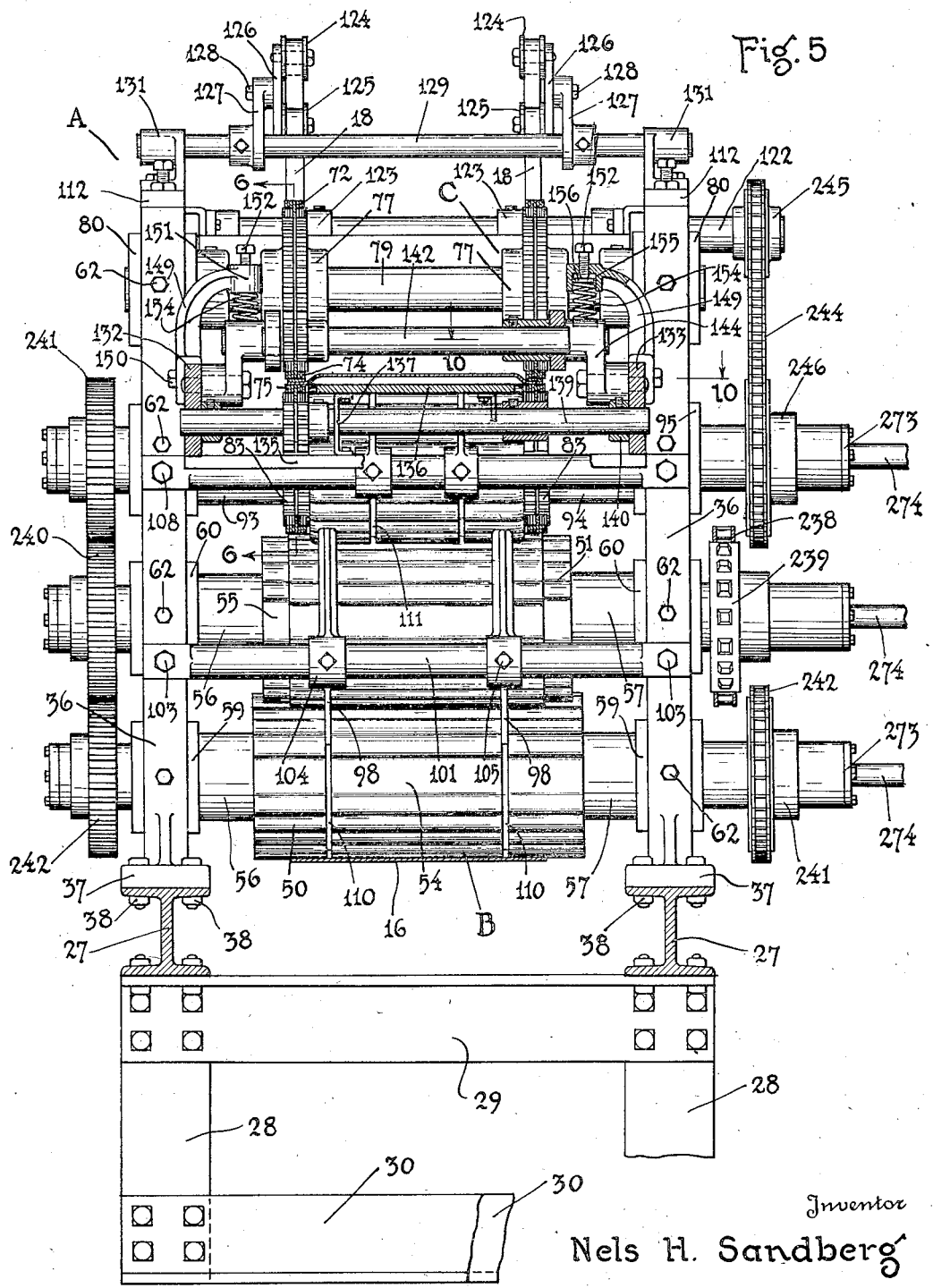

Dec. 24, 1935.  N. H. SANDBERG  2,025,179
MACHINE FOR FORMING EGG FLATS
Filed Oct. 2, 1933  7 Sheets-Sheet 6
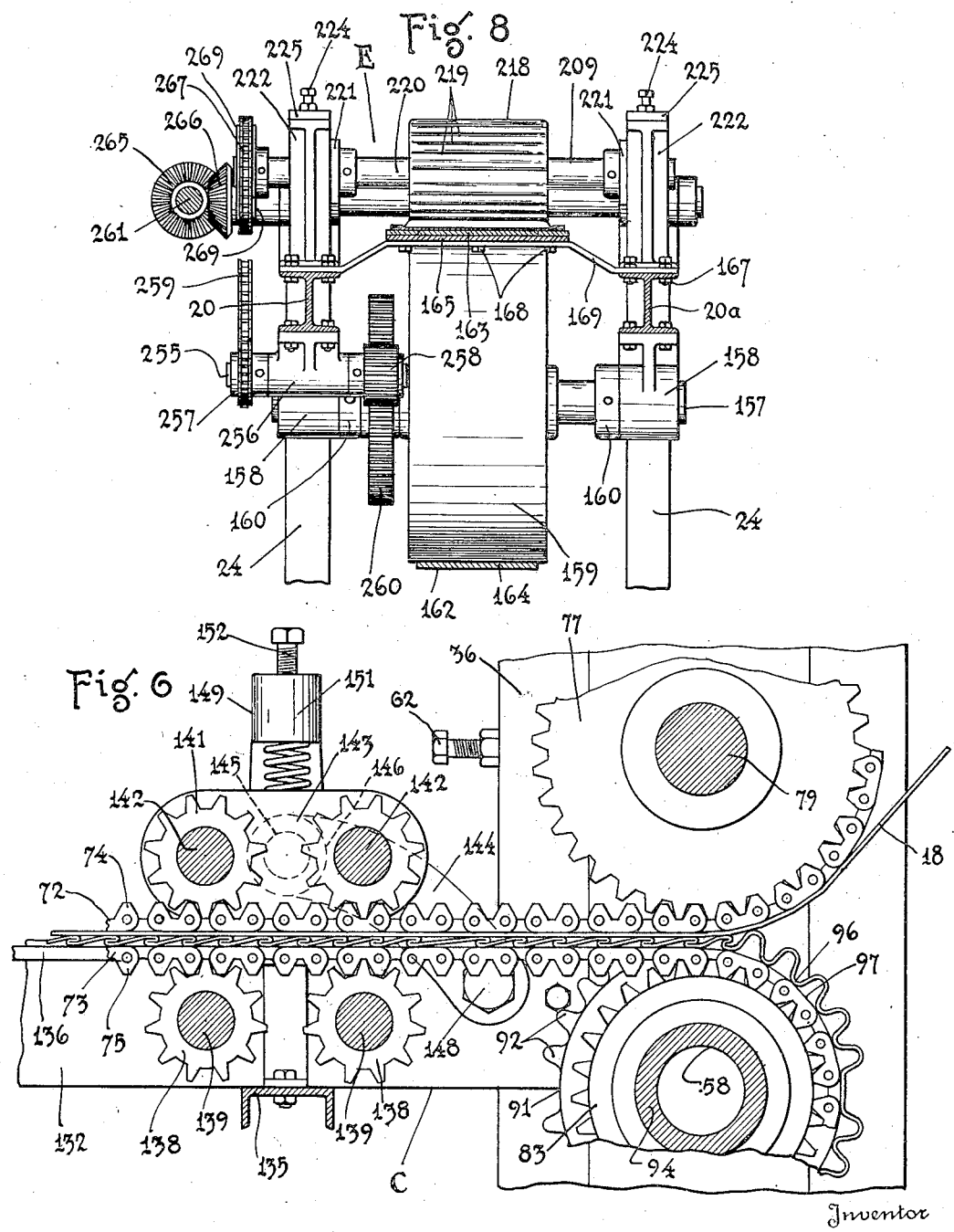
Inventor
Nels H. Sandberg
By Caswell & Lagaard
Attorneys

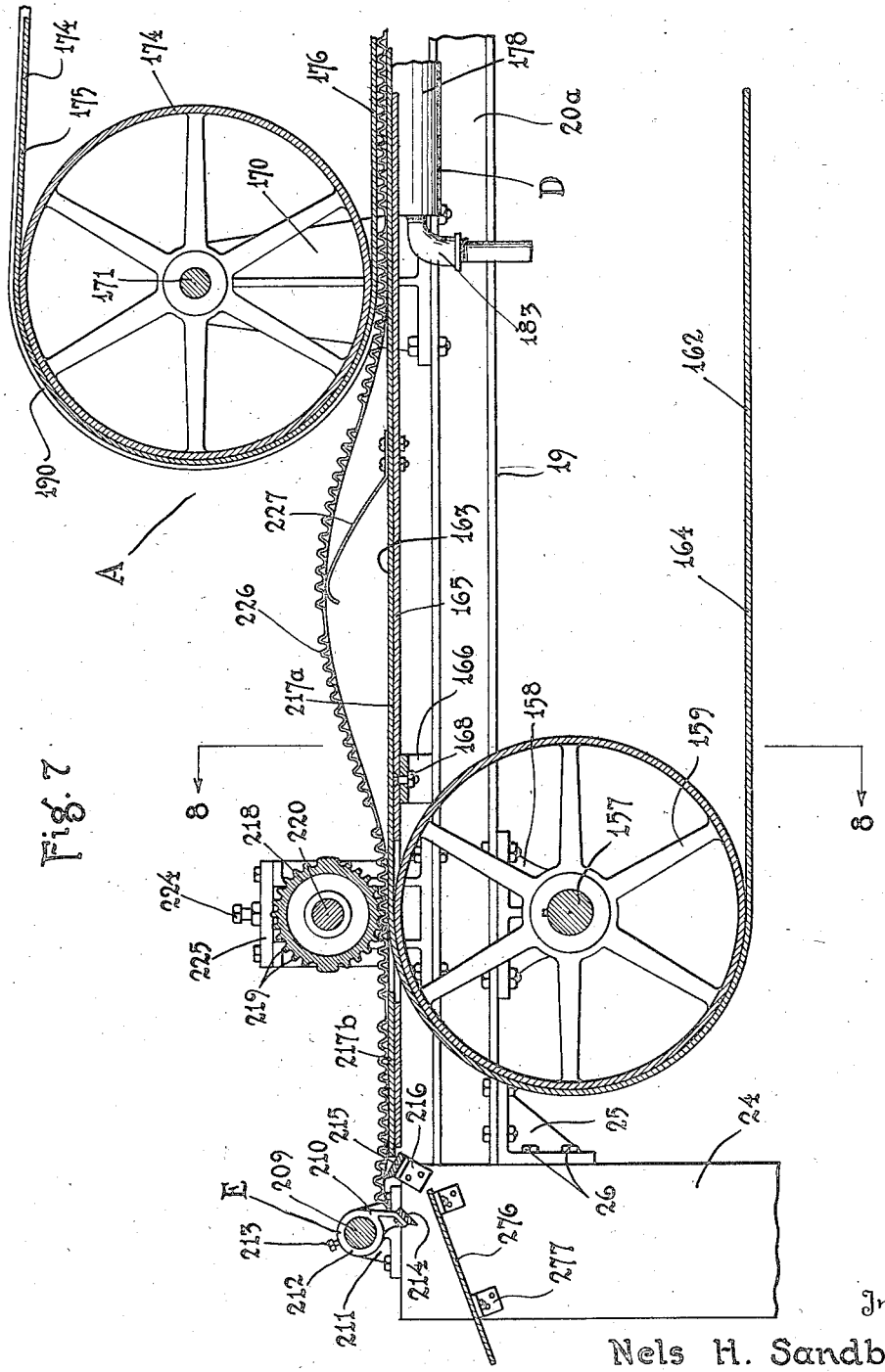

Patented Dec. 24, 1935

2,025,179

UNITED STATES PATENT OFFICE 2,025,179

MACHINE FOR FORMING EGG FLATS

Nels H. Sandberg, St. Paul, Minn., assignor to Waldorf Paper Products Company, St. Paul, Minn., a corporation of Minnesota Application October 2, 1933, Serial No. 691,815

16 Claims. (Cl. 154—31)

My invention relates to machines for forming egg flats and particularly to egg flats constructed from corrugated paper.

An object of the invention resides in providing a machine for forming egg flats such as disclosed in the application for patent of Reynolds Guyer for Egg flats, Ser. No. 630,637, filed August 27, 1932.

Another object of the invention resides in providing a machine by means of which egg flats such as described, may be automatically and continuously constructed.

A still further object of the invention resides in constructing the machine with corrugating rolls by means of which an elongated sheet of paper is continuously corrugated.

An object of the invention resides in providing holding means for holding the corrugations in form and in further providing folding means for folding over the walls of the corrugations at certain localities thereof to cause the same to overlie one another.

Another object of the invention resides in providing an applying device for applying attaching means to the folded over portions of the corrugations, whereby the corrugations are retained in the desired form.

An object of the invention resides in utilizing complemental chains passing over sprockets for folding over the portions of the corrugations.

A feature of the invention resides in feeding a ribbon of paper upon the folded over portions of the corrugations and in applying adhesive either to the paper or to the corrugations to cause the paper to adhere to the corrugations.

Another object of the invention resides in providing means for holding the ribbon applied to the corrugations and in further applying heat to such portions of the egg flat while the parts are so held to cause the adhesive to set or dry.

Other objects of the invention reside in the novel combination and arrangement of parts and in the details of construction hereinafter illustrated and/or described.

In the drawings:

Fig. 1 is an elevational view of the feed end of a machine for forming egg flats illustrating an embodiment of my invention.

Fig. 2 is an elevational view of the discharge end of the portion of the machine shown in Fig. 1.

Fig. 3 is a plan view of a part of the structure shown in Fig. 1 and drawn to a larger scale.

Fig. 4 is a longitudinal sectional view taken on line 4—4 of Fig. 3.

Fig. 5 is a cross sectional view taken on line 5—5 of Fig. 4.

Fig. 6 is a fragmentary elevational sectional view taken on line 6—6 of Fig. 5 and drawn to a larger scale.

Fig. 7 is a medial longitudinal sectional elevational view of a portion of the structure shown in Fig. 2.

Fig. 8 is a cross sectional view taken on line 8—8 of Fig. 7.

Fig. 9 is a cross sectional view taken on line 9—9 of Fig. 2.

Fig. 10 is a fragmentary plan sectional view taken on line 10—10 of Fig. 5.

Fig. 11 is a perspective view of one of the egg flats constructed with my invention.

The particular form of egg flat adapted to be manufactured upon my improved egg flat machine is illustrated at 10. This egg flat consists of a body portion 11 which is constructed from a sheet of paper stock 12. This sheet is corrugated transversely thereof to provide corrugations 13 which are exposed and free upon both the upper and lower sides thereof intermediate the edges of the sheet and the ends of the said corrugations. At the ends of the corrugations the same are folded over as indicated at 14 to cause the walls of the said corrugations at such localities to overlie one another. These parts of the corrugations are held in place through strips of ribbon 15 also constructed of paper, which strips are attached to the overlying portions of the corrugations through a suitable adhesive. The present invention forms the corrugations and thereafter folds over the ends of the same to cause the folds to overlie one another and then attaches the ribbons to the said structure to hold the intermediate portions of the corrugations in proper form.

My invention proper consists of an egg flat machine which I have indicated in its entirety by the reference character A. This machine comprises a corrugating mechanism B by means of which a sheet of paper 16 of a width equal to the width of the egg flat and wound in a roll 17 is transversely corrugated. The said machine further includes a folding mechanism C by means of which the ends of the corrugations are folded over to cause the walls of the said corrugations to overlie one another and by means of which ribbons 18 to which an adhesive has been applied are forced against the folded over portions of the corrugations. As the formed sheet leaves the mechanism C the same passes through a drying device D by means of which the adhesive applied to the ribbons is caused to dry and set. Thereafter the formed sheet passes through a transverse cutting mechanism E which cuts the sheet off into required lengths forming the individual egg flats illustrated. The supporting structure of the ribbon and the various mechanism referred to will now be described in detail.

My egg flat forming machine A is carried by a framework 19 which comprises two longitudinally extending I beams 20 and 20a which extend along the discharge end of the machine and throughout the intermediate portion of the machine. These I beams are supported intermediate their ends on posts 21 which are regularly spaced and which are attached to the said longitudinal beams through transverse frame members 22 and 23. The posts 21 may also be constructed as I beams while the cross frame members 22 and 23 are preferably angles which hold the post 21 and the said longitudinal beams in proper spaced relation. At the discharge end of the machine are provided two uprights 24 which are preferably formed as castings and which lie in continuation of the two longitudinal beams 20 and 20a. The said beams are attached to these uprights through brackets 25 which are bolted to the said beams by means of bolts 26.

At the feed end of the egg flat forming machine A are provided two longitudinally extending beams 27 which are preferably I beams and which are supported upon short posts 28. These two longitudinal beams are disposed below the elevation of the beams 20 and 20a and are attached to the posts 28 through transverse frame members 29 and 30 which similar to the frame members 22 and 23 extend across the framework and stiffen and reinforce the same. At the ends of the frame members 27 are provided two uprights 31 which are constructed with bases 32 adapted to be bolted to the upper flanges of the said beams 28 through bolts 33. The frame members 20 and 20a abut against the uprights 31 and are attached to said uprights by means of brackets 34 which are bolted to said uprights through bolts 35. By means of this construction, the entire framework is rigidly connected together and suitably supported at intervals to hold the various parts of the machine in proper operating relation. In addition to the uprights 31 two similar uprights 36 are employed which are provided with bases 37 bolted to the flanges of the frame members 23 through bolts 38. These uprights support the corrugating mechanism B of the invention as will be presently described in detail.

The roll of paper 17 from which the sheet 16 is unwound and from which the egg flats are constructed is rotatably mounted upon a shaft 39. This shaft is supported in two open bearings 40 which are attached to longitudinally extending frame members 41. Frame members 41 are preferably angles which are attached to short posts 42 which in turn are mounted upon the longitudinal frame members 27. Said parts are held attached through clip angles 43 which are riveted or bolted to the various parts. The two angles 41 are spaced from one another and the roll 17 is disposed therebetween, the sheet 16 being unwound from the roll and caused to extend between the two longitudinal frame members 27.

The ribbons 18 are wound upon two reels 44 which are rotatably mounted on a shaft 45. Shaft 45 is rigidly secured to a standard 46 constructed with a base 47 extending across the longitudinal frame members 41 and secured thereto as by bolts, rivets or otherwise. On the shaft 45 are provided collars 48 which are held in proper position through set screws 49. These collars are disposed one on each side of each reel 44 and hold said reels in proper position.

The corrugating mechanism B of the invention consists of two rolls 50 and 51 which are constructed with corrugations 52 and 53 extending longitudinally of said rolls upon the exterior thereof. Said corrugations are adapted to mesh with one another and are so arranged that when the sheet 16 is fed between said rolls the corrugations 13 in the finished egg flat are formed. The roll 50 is constructed at suitable intervals with depressions 54 of a width greater than that of the corrugations while the roll 51 is similarly constructed with raised portions 55 adapted to enter the depression 54. By means of this construction blank portions are formed at the ends of the egg flat which are adapted to be sheared in the severing of the various flats from the formed sheet.

The two rolls 50 and 51 are constructed with hollow trunnions 56 and 57 at the ends thereof. These trunnions have bores 58 therethrough, the use of which will be presently described. The trunnions 56 and 57 are journaled in bearings 59 and 60 mounted in the uprights 36. The uprights 36 are constructed with vertically extending ways 61 in which the said bearings are mounted, said bearings being vertically slidable along the same. By means of set screws 62 threaded in the said uprights, the various bearings can be held supported in any adjusted position so that rolls 50 and 51 may be caused to operate properly.

In the forming of the corrugations on the sheet 16, the sheet is preferably moistened as by spraying the same with steam while the paper passes from the roll 17 to the roller 50. Such construction has however not been shown in the drawings, though it can readily be comprehended that any type of steam nozzle may be used for the purpose. In order to dry the moistened paper after the corrugations have been formed, the various rolls 50, 51, and 91 are constructed hollow as shown in Fig. 4 and the trunnions provided with the bores 58 previously referred to. The trunnions 57 all have stuffing boxes 273 attached thereto which form fluid tight connections with a number of pipes 274 adapted to be connected to a source of steam. By means of this construction, steam is directed into the interiors of the various rollers which heats the same and dries the paper contacting therewith. Similar construction may be provided at the other ends of the rollers for discharging the condensation or steam from the rolls.

For the purpose of feeding the paper to the corrugating mechanism two idler rollers 63 and 64 are employed. These rollers are provided with shafts 270 and 271 which are journaled in bearings 66 and 67 bolted to the frame members 27. The roller 64 is disposed between the corrugating mechanism and the roll 17 while the roller 63 is situated on the other side of the corrugating mechanism. In addition to these rollers a feed roller 68 is employed which is provided with a shaft 272 and which is journaled in bearings 69 secured to the frame members 27. It will be noted that the roller 68 is above the framework 27 while the rollers 64 are below the same. The sheet of paper 16 passes from the roll 17 below the roller 64 over the roller 68 under the roller 63 and back to the under side of the corrugated roll 50 from which it is fed between the two corrugating rolls 50 and 51, as best shown in Fig. 4.

The roller 68 is driven at a rate of speed such that its peripheral velocity is greater than the linear rate of speed of the paper in moving through the machine. This causes the section of the sheet 16 indicated at 17 and disposed between rollers 63 and 68 to sag. To insure suitable friction between the roller 68 the said roller may be covered with a friction covering 71 illustrated in Fig. 4.

In order to maintain the sheet of paper 16 taut as the same is fed between the rollers 50 and 51 a brake 275 is employed. This brake is situated between the rolls 63 and 50. Brake 275 includes a bar 279 which extends across and is attached to the two frame members 27. Another bar 280 superimposes the bar 279 and is guided for vertical movement with respect thereto through a number of dowel pins 281 secured to the bar 279. The sheet of paper 16 passes between the two bars 279 and 280 and the weight of the bar 280 provides suitable friction to prevent slacking formed between the brake 275 and the roll 50.

The folding over of the portions 14 of the corrugations is accomplished through two sets of chains 72 and 73 which are arranged one set above the other. These chains have two of the runs thereof disposed in close proximity to one another and arranged back to back. The said runs of the chains are designated by the reference numerals 74 and 75 and are shown in detail in Fig. 6. The chains 72 are carried by two sets of sprocket wheels 76 and 77, the sprocket wheels 76 being rotatably mounted on a shaft 78 and the sprocket wheels 77 being similarly rotatably mounted on a shaft 79. Shaft 79 is journaled in bearings 80 mounted in the way 71 of uprights 36. These bearings are also held in adjusted position within the ways 61 through set screws 62 in a similar manner to the bearings previously referred to and thus supported in the said uprights. The shaft 78 is journaled in bearings 81 which similar to the bearings 80 are journaled in ways 82 formed in the uprights 31. The chains 73 are carried at one end on sprockets 83 which are mounted as will be presently explained. These chains are further supported on other sprockets similar to the sprockets 76 which are rotatably mounted on a shaft 84 similar to the shaft 78. Shaft 84 is journaled in bearings 85 which are mounted in the ways 82 of uprights 31 and which rest on cross bars 86 formed on said uprights at the lower ends of the ways 82. A suitable compression coil spring 87 disposed between each of the respective sets of bearings 81 and 85, said springs urging the bearings 85 against the cross bars 86 and the bearings 81 upwardly. Across the upper ends of the uprights 31 are provided bars 88 which are bolted to said uprights through bolts 89. These bars are tapped to receive adjusting screws 90 which engage the upper ends of the bearings 81 and operate to force said bearings downwardly against the action of the springs 87. By means of the said screws and springs the relative positions of the bearings 81 can be altered with respect to the bearings 85 and the two runs 74 and 75 of the chains 72 and 73 brought closer together or spread apart as becomes desirable.

For feeding the corrugated sheet between the sets of chains 72 and 73 a roll 91 is employed which is corrugated as designated at 92 to intermesh with the corrugations of the roll 51. This roll is constructed in a manner similar to the roll 50 and is formed with trunnions 93 and 94 similar to the trunnions 55 and 56. These trunnions are journaled in bearings 95 which are mounted in the ways 61 of uprights 36 and are held in proper adjusted position through the set screws 62 previously referred to. The roll 91 is of a length considerably less than the width of the corrugated sheet so that as the same pass over the said rolls the extreme lateral marginal portions of the sheet extend outwardly beyond the ends of the roll. At the ends of the said roll are arranged the two sprocket wheels 83 previously referred to and which carry the chains 73. These sprocket wheels are of such diameter that the inner ridges of the corrugations engage the back of the chain 73 as the said chain travels over the sprockets. The exact arrangement of the parts is shown in Fig. 6 where the ridges 96 of the corrugations are illustrated as contacting with the backs 97 of the chain 73. The shaft 79 is so adjusted that when the corrugated strip is fed adjacent the runs of chains 72 and 73 the portions of the corrugations at the ends thereof and adjacent the lateral marginal portions of the sheet are folded over as indicated at 14 in Fig. 10 and in Fig. 6.

In order to hold the corrugated sheet from becoming disengaged from the rolls and for causing the sheet to pass from one roll to the other, a number of arcuate fingers 98, 99 and 100 are employed which partially encircle the two rolls 51 and 91. The fingers 98 are mounted upon a rod 101 secured to the uprights 36. This rod is bolted to the said uprights through bolts 103. The fingers 98 are constructed with bosses 104 through which the said rod extends and are adjustably secured to said rod through set screws 105 threaded in said boss. In like manner, the fingers 99 and 100 are mounted on rods 106 and 107 similarly attached to the uprights 36 through bolts 108. The upper ends of the fingers 98 and 99 terminate short of the superimposed roll. The lower ends of said fingers which are indicated at 109 extend into grooves 110 formed in the rolls 50 and 51 respectively. In a similar manner the fingers extend into grooves 111 formed in the roll 91. By means of this construction the paper is automatically fed about the rolls and positive threading of the paper through the machine is accomplished.

At the same time that the corrugated sheet is fed between the sets of chains 72 and 73 the two ribbons 18 are covered with adhesive and simultaneously fed between the sets of chains and caused to adhere to the folded over portions 14 of the corrugated sheet. This is accomplished as follows. Across the upper ends of the two uprights 36 are provided two bars 112 which extend beyond the said uprights. These bars are bolted to the uprights by means of screws 113 which are threaded into said uprights. These bars support a reservoir 114 for an adhesive 115 contained therein. The reservoir 114 comprises a bottom 116, sides 117 and ends 118. The ends 118 are bent back to form flanges 119 which overlie the bars 112 and are bolted to them through bolts 120. Attached to the ends 118 of the reservoir 114 are bearings 121 which rotatably support a shaft 122. This shaft carries adhesive rollers 123 which are disposed in the planes of the chains 72 and 73 and in alignment with the ribbons 18. The rollers 123 dip into the adhesive 115 and engage the under sides of the ribbons 18 thereby coating the same with adhesive as the ribbon passes over said rollers.

The ribbons 18 are each guided through the adhesive applying device by means of two flanged guide rollers 124 and 125. These guide rollers are mounted on swinging supports 126 which in turn are bolted to brackets 127 through bolts 128. The brackets 127 are mounted upon a shaft 129 and may be adjustably held attached to said shaft through set screws 130. The shaft 129 is supported in two bearing blocks 131 which are rigidly attached to the bars 112. The shaft 129 is pinned or otherwise secured to these bearing blocks. By means of the arms 127 and the supports 126 the tension on the ribbons 18 can be adjusted and also the extent of contact of the said ribbon with the rollers 123. In this manner the adhesive can be properly applied to the undersides of the ribbons and as much adhesive as necessary deposited thereon. The ribbons 18 on leaving the gluing device pass over the rear wall 117 of the receptacle 115 and against the backs of the curved portions of the chains 72 as the same pass over the sprocket wheels 77. Said ribbons are thus fed on top of the folded portions 14 of the corrugated sheet and are forced against said portions of the sheet through the backs of the chains 72.

As the coated ribbons are brought into contact with the corrugated sheet, the same are firmly pressed against the formed sheet and so held in order to allow the adhesive to partially set. This is accomplished by a construction best shown in Figs. 1, 4, and 5. Between the pairs of uprights 31 and 36 are disposed two longitudinally extending bars 132 and 133. These bars are secured to the inner surfaces of said uprights by bolts 134. Extending across the undersides of these bars are transverse frame members 135 which are bolted thereto. A plate 136 of a width substantially equal to the length of the roller 91 extends above the said transverse frame members and between the two bars 132 and 133. This plate is carried by the said transverse frame members through short legs 137 attached thereto. The plate 136 is of such a height that the upper surface thereof lies flush with the surface 97 of the run 75 of chain 73. This plate supports the intermediate portion of the formed sheet and engages the ridges 96 of the corrugations. The runs 75 of the chains 73 are supported on a number of idler sprocket wheels 138 which are mounted on transverse shafts 139 extending across and journaled in bearings formed by drilling the two bars 132 and 133. These shafts are held from endwise movement through collars 140 secured to said shaft and abutting against the inner surface of said bars. The said sprockets are closely positioned so as to support the chains 73 at frequent intervals.

The run 94 of chain 72 is forced toward the run 75 of chain 73 through a number of sprocket wheels 141 which are arranged above the sprocket wheels 138 and which are arranged for yieldingly forcing the said runs of the chains together. Inasmuch as all of these sprocket wheels are mounted in the same manner only the sprocket wheels shown in Fig. 6 will be described in detail. Above the two shafts 139, shown in Fig. 6, which carry the sprocket wheels 138 are two similar shafts 142. These shafts are both journaled in suitable equalizer bars 143 which are pivotally connected to swinging arms 144. The bars 143 are constructed with trunnions 145 best shown in Fig. 10 which are journaled in bearings 146 formed on said arms. Said arms are further constructed with bearings 147 through which bolts 148 extend. These bolts are threaded into the two bars 132 and 133 and rotatably support the equalizer bars 143 and the structures carried thereby for movement toward and from the shafts 139. Superimposing each of the equalizer bars 143 is a bracket 149 best shown in Figs. 3, 5, and 6, which bracket is secured to said bar by bolts 150. Said bracket is constructed at its end with a boss 151 which overlies the bearing 148 of equalizer bar 143. A screw 152 is threaded into this boss. A compression coil spring 154 extends into a socket 155 in boss 151 and also into a socket 155 in the bearing 146. The said spring is seated against the bearing 146 and against a washer 156 slidable in the socket 155. Screw 152 is adapted to engage the said washer whereby the spring 154 may be compressed to procure any desired spring pressure against the sprocket wheels 141. By means of this construction the two chains are urged together to securely clamp and hold the ribbons against the formed sheet until the adhesive thereon has received its initial set.

For the purpose of maintaining the two chains 72 and 73 tight, two chain tighteners 203 and 204 are employed. Both of these tighteners are identical and only the tightener 203 will be described. The chain tightener 203 consists of a shaft 205 which is secured at its ends to two arms 206. Arms 206 are disposed adjacent the inner surfaces of the uprights 31 and are rigidly attached thereto through bolts 207. Upon the shaft 205 are rotatably mounted idler sheaves 208 which ride upon the outer surfaces of the two chains 72. The arms 206 may be swung about the bolts 207 so as to procure any desired pressure upon the respective chains. The chain tighteners 204 operate in identically the same manner to maintain the chains 73 tight.

The formed sheet is carried through the heating apparatus D by means of two conveyors which will now be described in detail. At the discharge end of the machine is mounted a transverse shaft 157 which is journaled in bearings 158 secured to the longitudinally extending frame members 20 and 20a of frame 19. This shaft has secured to it at its center a pulley 159 having a relatively wide face as indicated in Fig. 8. Collars 160 pinned or otherwise secured to the shaft 157 as by set screws, hold the shaft from longitudinal movement and retain the pulley 159 in a central position with respect to the two frame members 20 and 20a. A similar pulley 161 is mounted on the shaft 84 previously referred to and is in alignment with the pulley 159. An endless belt 162 passes over the two pulleys 159 and 161, the upper run of said belt being indicated at 163 and the lower run of said belt at 164. The belt 162 is of a width substantially equal to the width of the plate 165 previously referred to so that the folded over ends of the corrugations at the lateral marginal portions of the sheet are free. The plate 165 is supported through a number of transverse bars 166 which bars rest upon and are bolted to the I beams forming the longitudinal frame members 20 and 20a by means of bolts 167. Bolts 168 are formed with counter-sunk heads which lie flush with the upper surface of said plate. The bars 166 also form a support for other parts of the invention which will be subsequently described in detail. The plate 165 is further supported on a transverse bar 169 shown in Fig. 8 which is disposed in proximity to the shaft 157 and which similar to the bars 166 is attached to the frame members 20 through bolts 167. Other bolts 168 with counter-sunk heads secure the said plate to the bar 169.

Attached to the two frame members 20 and 20a of frame 19 and in spaced relation to the bearing 158 are two bearings 170 which extend upwardly from the said frame members. A shaft 171 is journaled in these bearings and extends transversely of the said frame. This shaft carries a pulley 172 similar in size and shape to the pulley 159. Shaft 171 is also held from endwise movement in a manner similar to that employed for shaft 157. The shaft 78 previously referred to also carries a pulley 173 similar to the pulley 161. An endless belt 174 passes over the two pulleys 172 and 173, the upper run of said belt being indicated by the reference numeral 175 and the lower run of said belt by the reference numeral 176. The diameters of the pulleys 172 and 173 are such that the two runs 176 and 165 of the belts 174 and 162 are spaced from each other at pulleys 173 and 161 a distance greater than the height of the corrugations of the formed sheet. The formed sheet on leaving the chains 72 and 73 pass in between the two runs 176 and 165 of belts 174 and 162 and is carried through the machine through the action of the said belts. The run 176 rests upon the plate 165 as previously described, while the weight of the run 176 causes the said run to engage the upper surface of the formed sheet which causes the said sheet to be moved through the heating device proper.

The heating and drying device D consists of two longitudinally extending pipes 177 and 178 which are planed flat along the upper surfaces thereof as designated at 179 and 180. These pipes are so arranged that the surfaces 179 and 180 thereof lie flush with the upper surface of the run 165 of belt 162 and form ways along which the folded over portions 14 of the sheet may ride. The pipes 177 and 178 are supported through the cross bars 166 which are formed with seats 181 adapted to receive said pipes. The said pipes extend between the shafts 84 and 171, said pipes falling short of said shafts. At the ends of the pipes adjacent shaft 84 are provided pipe fittings 182 by means of which the said pipes may be connected to a source of steam. Similar fittings 183 at the other ends of the pipes serve to lead the condensation from the pipes back to the boiler or to any suitable reservoir. It will readily be comprehended, that the folded over portions 14 of the sheet as the same pass along the ways 179 and 180 of said pipes become heated and that the adhesive thereon is dried and caused to set.

In order to maintain the folded over portions 14 of the sheet in contact with ways 179 and 180 the following construction is employed. Slightly in advance of the shaft 78 is provided another shaft 184 which is journaled in bearings 185 secured to the frame members 20 and 20a, which bearings extend upwardly therefrom. This shaft is held from longitudinal movement with respect to the said bearings through collars 186 secured to said shafts through pins, set screws, or otherwise. Upon the shaft 184 are mounted two relatively narrow pulleys 187 and 188. The shaft 184 extends transversely of the machine and is disposed between the two runs 175 and 176 of belt 174, the two pulleys 187 and 188 being disposed on either side of the said belt. The pulley 172 which is mounted on shaft 171 is considerably wider than the belt 174, and extends outwardly beyond the lateral edges of said belt on both sides. Two other belts 189 and 190 of about the same width as the ways 179 and 180 of pipes 177 and 178 pass over the extended portions of the pulley 172 and also over the respective pulleys 187 and 188. These belts are somewhat thicker than belt 172. These belts ride upon the ribbons 18 and operate to exert pressure against the said ribbons to cause the formed sheet to ride upon the ways 179 and 180.

To provide suitable pressure for the purpose of causing the formed ends of the sheet 16 to engage the ways 179 and 180, a plurality of rollers 191 are employed, which rollers are best shown in Fig. 9. Said rollers are formed at their ends with portions 191 of sufficient width to engage the lower runs 193 of the two belts 189 and 190. The intermediate portion 194 of each of said rollers is cut away so that the run 176 of belt 174 clears the said rollers. Rollers 191 are further constructed at their ends with trunnions 195 which are rotatably mounted in slots 196 formed in the upstanding legs 197 of two longitudinally extending angles 198 and 199. These angles form a support for the rollers 191 which are distributed throughout the length of the heating pipes 177 and 178 at suitable intervals. The angles 198 and 199 are supported through bolts 200 which are threaded into the cross bars 166 and which also extend through the horizontal legs 201 of the said angles and are attached thereto through nuts 202. By means of the said nuts the position of the angles may be adjusted so that the trunnions 195 of rollers 191 ride freely in the grooves 196, permitting the weight of the rollers to bear down upon the runs 193 of belts 189 and 190 and to cause sufficient pressure upon the said belts to bring the formed portions of the sheet in intimate contact with the ways 179 and 180.

The individual egg flats are constructed from the formed sheet by cutting the same off at suitable intervals. For this purpose a cutter shaft 209 is employed which is journaled in bearings 211 attached to the uprights 24. This shaft carries a number of arms 210 which are constructed with drilled bosses 212 through which the shaft 209 extends. By means of set screws 213 threaded in said bosses, said arms are securely attached to the shaft 209. The arms 210 have secured to them a cutting blade 214 which rotates with the shaft 209 and which is adapted to engage a stationary cutting blade 215. The latter blade is attached through clip angles 216 to the inner surfaces of the two uprights 24. As the shaft 209 is turned in a clockwise direction as viewed in Fig. 7, blade 214 engages blade 215 and shears off sections of the formed sheet to construct the various egg flats. The plate 165 on which the sheet travels extends up to within a short distance of the blade 215 and the same is constructed with an opening 217 through which the upper run 163 of belt 162 extends. The plate at such locality is somewhat wider than elsewhere and forms a support for the entire width of the sheet, the marginal portions of the plate adjacent the belt 162 and beyond the pulleys 172 and the entire area of the plate beyond pulley 159 being raised to the level of the belt through filler members 217a and 217b.

The egg flats when severed by the cutting device E are discharged from a chute 276 best shown in Fig. 7. This chute is mounted upon a number of clip angles 277 which are secured to the uprights 224.

In order to cause the cutting device E to operate at the desired locality of the strip, a feed roller 218 is employed which is constructed with corrugations 219 adapted to fit into the corrugations formed in the sheet proper. This roller is mounted on a shaft 220 which is journaled in bearings 221. The bearings 221 are slidably mounted in uprights 222 similar to the uprights 31. These bearings are adjustably supported in said uprights through compression coil springs 223 which urge the said bearings upwardly and through adjusting screws 224 threaded in bars 225 extending across the upper ends of said uprights. Inasmuch as the feed roller 218 is positioned in close proximity to the cutting mechanism E, the sheet is maintained in proper position so that the same is severed at the proper locality by said cutting mechanism.

To prevent tearing of the sheet in the event that the corrugations at any locality may be inaccurately formed, the sheet is arched upwardly as designated at 226 in Fig. 7. This portion of the sheet is supported through a leaf spring finger 227 which is attached to filler members 217a mounted on plate 165. This finger normally holds the sheet in the position shown. In the event that the sheet becomes too long, the arc increases. If the sheet becomes too short the arc decreases. In this manner tearing or injury to the sheet is prevented.

For the purpose of driving the various shafts and other rotatable structures of the invention, a drive shaft 228 is employed. This shaft is journaled in bearings 229 secured to the longitudinal frame members 20 and 20a. The shaft 228 carries at its outer end a sprocket wheel 230 which is adapted to be driven from an electric motor, not shown. Shaft 228 carries two sprocket wheels 231 and 232 which are keyed or otherwise secured to the same. A chain 233 passes over the sprocket wheel 231 and another sprocket wheel 234 secured to shaft 184. Still another chain 235 passes over sprocket wheel 232 and another sprocket wheel 236 secured to shaft 78. Through the action of these two chains the chain 72 and the rearward end of the belts 189 and 190 are driven. The shaft 228 has secured to it another sprocket wheel 337 which is disposed on the opposite side of the framework 19. A chain 238 passes over this sprocket wheel and another sprocket wheel 239 secured to trunnion 57 of roller 51. The other trunnion 56 of this roller has attached to it a spur gear 240 which meshes with similar spur gears 241 and 242 secured to the trunnions 56 of the rollers 91 and 54. Through the action of these gears the various rollers are operated in opposite directions and are driven from the single sprocket wheel 239.

The operation of the stock feeding roller 68 is procured through a sprocket wheel 241 mounted on the end of the trunnion 57 of roller 54. A chain 242 passes over this sprocket wheel and a sprocket pinion 243 on the end of shaft 272. This drive serves to operate the roller 68 in a manner to cause the proper feeding of the paper as previously described.

The shaft 122 on which the adhesive applying rollers 123 are mounted is driven through a chain 244. This chain passes over a sprocket 245 fast on the end of said shaft and over another sprocket wheel 246 fast on the trunnion 57 of roller 91. By means of this construction, adhesive is caused to be positively applied to the various ribbons 18 as the same pass through the adhesive applying device.

In order to drive the two belts 174 and 162 a chain 247 is employed. This chain passes over a sprocket wheel 248 fast on shaft 171, and over another sprocket wheel 249 secured to the drive shaft 228. The runs of the chain 248 are carried in channel shaped troughs 250 and 251 which are attached to standards 253 secured to the frame member 20.

The shaft 157 is driven from the shaft 171 as follows: On the end of the shaft 171 is a sprocket wheel 254. A counter shaft 255 is utilized which is journaled in a bearing 256 secured to the underside of one of the frame members 20. This shaft carries a sprocket wheel 257 and also a spur pinion 258. A chain 259 passes over the sprocket wheel 254 and sprocket pinion 257 while the spur pinion 258 meshes with a spur gear 260 secured to the shaft 157. Rotation of the shaft 171 hence procures rotation of shaft 157 in the same direction. Through the action of chain 247 the belts are driven from the discharge ends thereof so that the slack in the adjacent runs 176 and 163 of said belts is taken up whereby the formed sheet is positively conveyed through the machine.

For the purpose of driving the cutter shaft 209 a longitudinally extending counter shaft 261 is employed. This shaft is journaled in a suitable bearing 262 secured to the frame member 20 and to the uprights 24. Shaft 261 has attached to it at one end a bevel pinion 263 which meshes with a bevel gear 264 fast on shaft 228. Shaft 261 has attached to its other end another bevel gear 265 which meshes with a bevel gear 266 fast on the cutter shaft 209. These gears are so disposed that clockwise rotation of the shaft 228 also produces clockwise rotation of the shaft 209 as viewed in the drawings, whereby the cutter blade 214 is caused to operate in the proper direction to shear the sections of the formed sheet therefrom.

The feed roller 218 is driven by a chain 267. This chain passes over a sprocket wheel 268 on the shaft 220 and over another sprocket wheel 268 on the shaft 220 and over another sprocket wheel 269 on shaft 209.

The operation of my invention may be summarized as follows: The sheet of paper which is wound on the roll 17 is unreeled therefrom and passes successively over the rolls 64, 68 and 63. During such movement of the sheet the same is moistened by the steam spray. The sheet then passes through the brake 275 and then about the various rolls 50, 51, and 91. In its passage between the two rolls 50 and 51 the same is formed with corrugations. After corrugation, the sheet is dried through the steam entering the various rolls. The corrugated sheet then passes between the various chains 72 and 73 by means of which the ends of the corrugations are folded over. At the same time the ribbons 18 are fed through the adhesive applying device and coated with adhesive. The two ribbons are simultaneously fed between the two chains 72 and 73 and upon the folded portions of the corrugations whereby said ribbons are attached to the corrugated sheet. During the travel of the composite structure along the chains 72 and 73 the various sprocket wheels 138 and 141 serve to force the ribbons against the formed sheet thereby causing the adhesive to receive its initial set. As the composite structure leaves the chains 72 and 73 the intermediate portion of the sheet is carried between the two belts 174 and 162. At the same time the lateral marginal portions of the sheet are caused to ride upon the ways 179 and 180 of the heated pipes 177 and 178. Pressure is exerted upon this part of the sheet through the rollers 191 which bear down upon the runs 193 of belts 189 and 190, thereby causing intimate contact between the ways and the lateral portions of the formed sheet. When the formed sheet leaves the ways 193 the adhesive has received its permanent set and the parts are firmly united. Thereafter the formed sheet is run through the cutting device and sections of the sheet severed by the cutting blades 214 and 215 to form the individual egg flats. The spring 227 affords sufficient slack in the sheet to prevent tearing of the same. As the completed egg flats are formed the same are discharged from the machine by means of the chute 276 and may be collected and stored in any suitable manner.

My invention is highly advantageous in that an extremely practical and efficient device is provided whereby egg flats of the character described can be rapidly and economically produced. By the moistening of the paper prior to the formation of the corrugations breaking of the paper during the formation of the same is prevented. Subsequent heating of the corrugating rolls causes the paper to retain its altered form and produces fixed corrugations. By running the formed parts of the sheet between the runs of the chains, the adhesive applied to the ribbon is caused to receive its initial set so that the formed sheet may be readily handled in the subsequent steps of the process. Through the action of the heating means employed the adhesive is caused to dry and receive its final set. By maintaining slack in the formed sheet, danger of breakage is prevented through the operation of the feeding mechanism by means of which the formed sheet is fed to the cutting device.

Changes in the specific form of my invention, as herein disclosed, may be made within the scope of what is claimed without departing from the spirit of my invention.

Having described my invention, what I claim as new and desire to protect by Letters Patent is:

1. In a machine for forming egg flats, means for corrugating a sheet, means for temporarily holding the sheet at certain portions thereof to retain said corrugations, means for crushing the corrugations at certain localities while so held and means for applying fastening means to the corrugations at the crushed portions thereof to retain the form of the corrugations when the holding means is removed.

2. In a machine for forming egg flats, means for corrugating a sheet, means for temporarily holding the sheet at certain portions thereof to retain said corrugations, means for folding the corrugations at certain localities into overlying relation while so held, and means for applying fastening means to the overlying portions of the corrugations.

3. In a machine for forming egg flats, means for forming corrugations in a sheet, means for retaining the form of said corrugations including a support for the formed corrugations, said support engaging the corrugations solely at the ridges on one side thereof and at certain localities of the corrugations, means engaging the ridges on the other sides of the corrugations and at the same localities for folding over the corrugations to cause walls thereof to overlie one another, and means for applying fastening means to the corrugations at the folded over portions thereof.

4. In a machine for forming egg flats, means for forming corrugations in a sheet and for holding the corrugations in form, said means including a roll having longitudinally extending corrugations, said roll being free from corrugations at certain circumferential localities, supporting means at such localities of the roll for engaging the ridges of the corrugations, means for forcing the corrugations of the sheet against said supporting means to cause the walls of the corrugations to overlie one another, and means for applying fastening means to such portions of the sheet.

5. In a machine for forming egg flats, means for forming corrugations in a sheet and for holding the corrugations in form, said means including a roll having longitudinally extending corrugations, said roll being free from corrugations at certain circumferential localities, supporting means at such localities of the roll for engaging the ridges of the corrugations, means for forcing the corrugations of the sheet against said supporting means to cause the walls of the corrugations to overlie one another, means for feeding a ribbon upon the overlying portions of the corrugations and adhesive applying means for causing attachment of the ribbon to the folded portions of the corrugations.

6. In a machine for forming egg flats, means for forming corrugations in a sheet and for holding the corrugations in form, said means including a roll having longitudinally extending corrugations, said roll being free from corrugations at certain circumferential localities, supporting means at such localities of the roll for engaging the ridges of the corrugations, revoluble means disposed in proximity to said supporting means and operating in conjunction therewith to cause the walls of the corrugations to overlie one another and means for applying fastening means to such portions of the sheet.

7. In a machine for forming egg flats, means for forming corrugations in a sheet and for holding the corrugations in form, said means including a roll having longitudinally extending corrugations, said roll being free from corrugations at certain circumferential localities, sprocket wheels situated at such localities of the rolls and concentric therewith, chains passing over said sprocket wheels, the outer surfaces of said chains engaging the corrugations at the ridges thereof, means for forcing the corrugations against said surfaces of said chains, to cause the walls of the corrugations to overlie one another, and means for applying fastening means to such portions of the corrugations.

8. In a machine for forming egg flats, means for forming corrugations in a sheet and for holding the corrugations in form, said means including a roll having longitudinally extending corrugations, said roll being free from corrugations at certain circumferential localities, sprocket wheels situated at such localities of the rolls and concentric therewith, chains passing over said sprocket wheels, the outer surfaces of said chains engaging the corrugations at the ridges thereof, other sprocket wheels opposite said first named sprocket wheels, chains passing over said second named sprocket wheels, the adjacent runs of the backs of said chains being spaced apart a distance less than the height of the corrugations for bringing the walls of the corrugations in overlying position, means for feeding ribbons between one set of chains and the overlying portions of the corrugations and adhesive applying means for causing the ribbons to adhere to the corrugations.

9. In a machine for forming egg flats, means for forming transverse corrugations in an elongated sheet, means for temporarily holding the sheet at certain portions thereof from elongation to retain said corrugations, means for folding over the walls of the corrugations at certain localities to cause the same to overlie one another, means for gluing ribbons to the folded over portions of the sheet, a support along which the sheet passes, means for heating the support, and means movable with the sheet for pressing the folded over portions of the corrugations against the heated support.

10. In a machine for forming egg flats, means for forming transverse corrugations in an elongated sheet, means for temporarily holding the sheet at certain portions thereof from elongation to retain said corrugations, means for folding over the walls of the corrugations at certain localities to cause the same to overlie one another, means for gluing ribbons to the folded over portions of the sheet, a support along which the sheet passes, means for heating the support, and endless belts overlying the sheet at the folded over portions of said corrugations and traveling with the sheet, and means for pressing the belts against the sheet.

11. In a machine for forming egg flats, means for forming transverse corrugations in an elongated sheet, means for temporarily holding the sheet at certain portions thereof from elongation to retain said corrugations, said means including a roll having longitudinally extending corrugations, said roll being free from corrugations at certain circumferential localities, sprocket wheels situated at such localities of the rolls and concentric therewith, chains passing over said sprocket wheels, the outer surfaces of said chains engaging the corrugations at the ridges thereof, other sprocket wheels opposite said first named sprocket wheels, chains passing over said second named sprocket wheels, the adjacent runs of said chains being parallel, means for feeding ribbons between one set of chains and the sheet, adhesive applying means for causing the ribbons to adhere to the corrugations, and means extending throughout the parallel runs of the chains for forcing said runs toward one another.

12. In a machine for forming egg flats from an elongated sheet, a pair of corrugating rolls of a width not less than the width of the sheet, a holding roll of a width less than the width of the sheet supports at the ends of the holding roll and engaging the lateral marginal portions of the sheet at the ridges of the corrugations, means cooperating therewith for folding over the walls of the corrugations at the lateral marginal portions thereof, and means for applying attaching means to such portions of the sheet.

13. In a machine for forming egg flats, means for corrugating a sheet, means for temporarily holding the sheet at certain portions thereof to retain said corrugations, means for folding the corrugations at certain localities into overlying relation while so held, means for coating a ribbon with adhesive, and means for applying the coated ribbon to the exposed surfaces of the folded portions of the corrugations.

14. In a machine for forming egg flats, means for forming corrugations in a sheet of given width throughout the width of the sheet, means for holding the corrugations in form at the center of the sheet, means for crushing the corrugations at the marginal portions of the sheet while so held, and means for securing a ribbon to the marginal portion of the sheet after the same has been crushed.

15. In a machine for forming egg flats, means for forming corrugations in a sheet of given width throughout the width of the sheet, a pair of corrugated rolls for holding the corrugations in form, means concentric with said rolls for crushing the sheet at certain localities, and means for applying a ribbon to the crushed portion of the corrugations.

16. In a machine for forming egg flats, means for forming transverse corrugations in an elongated sheet, means for folding over the walls of the corrugations at certain localities to cause the same to overlie one another, means for gluing ribbons to the folded over portions of the sheet, a support along which the sheet passes, means for heating the support, and means movable with the sheet for pressing the folded over portions of the corrugations against the heated support.

NELS H. SANDBERG.